United States Patent

[11] 3,601,363

[72] Inventors Frank H. Mueller;
Wilbur R. Leopold, Jr.; John J. Smith, all of Decatur, Ill.
[21] Appl. No. 871,363
[22] Filed Aug. 5, 1969
Division of Ser. No. 794,822, Nov. 26, 1968, which is a Division of Ser. No. 417,435, Dec. 10, 1964, Patent No. 3,437,106
[45] Patented Aug. 24, 1971
[73] Assignee Mueller Co.
Decatur, Ill.

[54] BALL VALVES
1 Claim, 3 Drawing Figs.
[52] U.S. Cl. .................................................. 251/288, 251/172, 251/315
[51] Int. Cl. ................................................... F16k 51/00, F16k 5/20
[50] Field of Search .......................................... 251/172, 288, 315, 284, 286

[56] References Cited
UNITED STATES PATENTS

| | | | |
|---|---|---|---|
| 668,557 | 2/1901 | Englen | 251/288 |
| 2,800,295 | 7/1957 | Thomas et al. | 251/172 X |
| 2,983,479 | 5/1961 | Thomas | 251/172 X |
| 3,037,738 | 6/1962 | Jackson et al. | 251/315 X |
| 3,184,213 | 5/1965 | Anderson | 251/315 X |
| 3,192,943 | 7/1965 | Moen | 251/288 X |
| 2,825,527 | 3/1958 | Wendell | 251/315 X |
| 3,154,094 | 10/1964 | Bredtschneider et al. | 251/315 X |
| 3,241,570 | 3/1966 | Mueller | 251/312 X |

Primary Examiner—Henry T. Klinksiek
Attorney—Cushman, Darby & Cushman

ABSTRACT: A ball valve is provided with resilient annular seats between the ball and housing through passageway. The housing is provided with opposed lateral openings, through one of which a key including a valve ball is received. One trunnion of the key protrudes into the other opening and is sealed with respect thereto by an O-ring received in an annular groove in that trunnion. The housing is flat surrounding where the valve key is inserted in the housing. An L-shaped spacer bears against the ball and is mounted upon the flat surface via screws, two separated ones of which function as stops for rotation of the valve key. A resilient gasket is interposed between the L-shaped spacer and the flat surface.

PATENTED AUG 24 1971  3,601,363

INVENTORS
FRANK H. MUELLER
WILBUR R. LEOPOLD, JR.
JOHN J. SMITH

BY

ATTORNEYS

BALL VALVES

This application is a division of our copending application Ser. No. 794,822, filed Nov. 26, 1968 as a division of our earlier application Ser. No. 417,435, filed Dec. 10, 1964, now U.S. Pat. No. 3,437,106, issued Apr. 8, 1969.

BACKGROUND OF THE INVENTION

The present invention relates to valves and more particularly to improvements in valves having a rotatable valve body and resilient means to increase the coating pressure between the body and the valve seats when the valve is in its closed position. Many prior art valves of this general type have not been providable with means for rendering them tamperproof, for instance for use by gas utility companies in distribution of gas products to residential users.

Valves which are tamperproof can be installed in the supply lines for domestic gas immediately prior to the gas meter so that the utility can determine when gas will be supplied to the user. Such valves are commonly referred to as meter stops, and insofar as stops can be made tamperproof and discourage unauthorized prospective tamperers from attempting their disassembly, the utility is able to be confident that they are exercising effective control of the gas they supply so that they will be remunerated for all of the gas being used. Additionally, it is desirable in this type of valve to assure that attempts at unauthorized disassembly or tampering with the valves will not render them dangerous, for instance by causing them to leak gas to the atmosphere.

Most usually, unauthorized tamperers are those seeking to withdraw gas from a supply line surreptitiously by removing the valve rotor retaining means and the rotor, and collecting the gas escaping from the rotor receiving chamber. Such tampering is only effectively accomplishable where the procedure just set forth can be effected without visibly damaging the valve or rendering it thereafter inoperable.

Accordingly, in order to render such valves effectively tamperproof and safe it is necessary to construct them so they are not disassembleable by unauthorized persons with conventional tools or without being rendered thereafter inoperable. It is also an important consideration that the tamperproof arrangement not unduly restrict or hinder authorized repair and preventive maintenance work on the valves by representatives of the utility company.

Essentially, the subject valves are intended to be used as water curb stops, although they can be used for other purposes. When used as curb stops, however, they normally are buried in the earth, and so it is desirable for such valves to have a one-piece body or housing to facilitate sealing the same against the entry of grit-carrying ground water, dirt, and the like. Additionally, it is most desirable for such valves to have a completely enclosed check arrangement, i.e. the arrangement which limits the rotation of the valve plug between open and closed positions of the valve.

In the preferred embodiment to be described hereinafter, it is noted that the body is of one-piece construction having what may be called a closed bottom and an open top. In the art, this arrangement for ball valves is known as a "top entry" arrangement, because the valve ball is inserted from the top. The lower end of the body is provided with a cylindrical journal bearing for the lower trunnion on the ball, while the inner ends of the body flow ports are provided with the cylindrical recesses in which annular cylindrical seats are slidably mounted. The outer end of each valve seat is exteriorly reduced to provide an annular space for the reception of an O-ring between the seat and the seat recess. It will be noted that the outer end of each seat is received within the flow passage so as to more effectively isolate the O-rings.

The seats, which preferably are made of a material such as nylon, the O-rings, and the valve ball are so proportioned that the latter can be inserted through the open upper end of the valve body, with the ball in an open position, between the two seat rings. When the O-rings are relaxed, the space between the two seat rings is somewhat less than the corresponding dimension of the valve ball in its open position. Hence, when the valve ball is inserted between the sear rings as aforesaid, the latter are forced back into their sear recesses against the spring action of the O-rings, so that the two seat rings are maintained constantly in yieldable engagement with the valve ball.

As the valve ball is rotated from its open to its closed position, the spherical configuration of the valve ball forces the seat rings even further back into their recesses against the action of the O-rings. When the valve is closed, upstream fluid pressure essentially acts on the annular area of the O-rings to constantly force the upstream seat ring against the valve ball to maintain a tight seal. In this respect, a trunnion-supported valve ball depends for its sealing effect upon upstream pressure holding the upstream seat tightly against the valve ball. In other valve ball arrangements, wherein the valve ball is not trunnion supported, upstream line pressure holds tee valve ball, when closed, tightly against the downstream seat to effect the seal.

The opening in the top of the valve body, at its inner end, is of a configuration corresponding to the outline of the valve ball when the latter is in its open position, so that the inner end of the opening is shaped so that it will just admit the entrance of the valve ball between the seat rings. It will be noted that this configuration of the opening provides, at its inner end, two opposed transverse, flat surfaces, and very practical use is made of these surfaces as described hereinafter.

Above its inner end, the top opening in the body is interiorly enlarged to a cylindrical or circular configuration for the snug rotatable reception of a corresponding cylindrical portion of a cap which, in a sense, acts as a valve stem. The cylindrical portion of the cap is provided with a circumferential groove for the reception of an O-ring which effectively makes a seal between the bottom of the groove in the cap and the opposed cylindrical surface in the body. Thus, the open upper end of the valve housing is effectively sealed.

SUMMARY OF THE INVENTION

Accordingly, it is an object of the present invention to provide valves susceptible of rotor removal and seat replacement while the valve remains in line.

A ball valve is provided with resilient annular seats between the ball and housing through passageway. The housing is provided with opposed lateral openings, through one of which a key including a valve ball is received. One trunnion of the key protrudes into the other opening and is sealed with respect thereto by an O-ring received in an annular groove in that trunnion.

Yet another object of the invention is to provide valves of the type described that are usable as water works water curb stops having the valve housing bottom closed around the bottom trunnion of tee rotor and which may alternatively have an open bottom with an O-ring seal provided to seal the bottom trunnion to the housing.

It is a further object of this invention to provide valves of the type described wherein the operating means is pinned to the top trunnion so that any desired form of operator, such as a lever handle, T-head, plain head, lock wing or the like may be provided thereon, thus effectively broadening the scope of usefulness of the valves according to the invention.

It is an object according to an embodiment of the invention to provide a valve of the type described wherein the check is a compact integral part of the valve operating head or cap arranged so that any overload on the check does not affect the ball or the seating arrangement.

These and further objects of the present invention will be more fully set forth in the following detailed explanation of the preferred embodiment of the invention having reference to the attached drawing wherein an embodiment illustrating the principles of the present invention is depicted.

IN THE DRAWING

The valve species to which this case is directed is one of several described in the first parent application, now U.S. Pat. No. 3,437,106 and is the depicted in FIGS. 22–24 thereof. The background of the invention is further discernible from a reading of that patent in view of its expansive description of the several embodiments disclosed therein.

Figure 1:
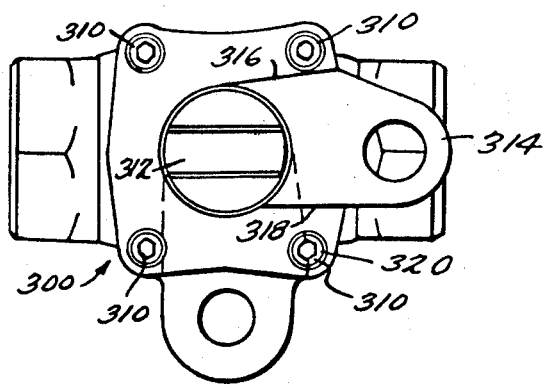
FIG. 1 is a longitudinal sectional view of a valve embodiment of the invention.
Figure 2:
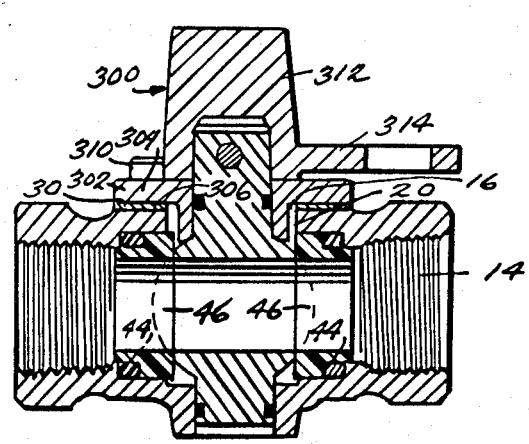
FIG. 2 is a top plan view of the valve of FIG. 1.
Figure 3:
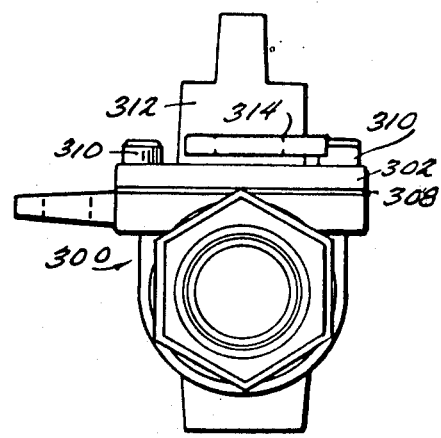
FIG. 3 is an end elevation view of the valve of FIGS. 1 and 2.

An embodiment of the open bottomed valve is in accordance with the principles of this invention is illustrated at 300 in FIGS. 1—3. In this embodiment which is also susceptible of rapid assembly and disassembly the overall height of the chamber 20 and thus of the valve 300 has been reduced by the elimination of the upstanding annular wall 18 surrounding the opening 16. Instead thereof the L-sectioned spacer 302 horizontally extending portion 304 is radially enlarged compared to the diameters of the spacers in the embodiments of FIGS. 1–21 of U.S. Pat. No. 3,437,106.

The spacer 302 is arranged to seat on the flat surface 306 with a washer-like annular resilient gasket 308 interposed between the spacer and the surface 30. A plurality of screws 310 secure the spacer to the valve housing.

The key cap 312 of the valve 300 is shown in FIG. 2 having an angularly enlarged lock wing 314 so that a first edge 316 of the lock wing is engageable with one of the screws 310 and a second edge 318 thereof is engageable with a second screw 310 spaced 180° from the first. Due to the angular width of the lock wing 314, the possible movement of the key of the valve 300 is limited to the 90° interval between the fully open position shown in full lines in FIG. 1 and the fully closed position indicated in dashed lines.

Preferably the screw 310 angularly intermediate the path of the lock wing movement has a flat head 320 rather than one which would interfere with the movement of the lock wing.

It should now be readily apparent that the embodiment of the novel ball valve shown efficiently accomplishes all of the objects set forth hereinabove and well illustrates, the principles of the present invention.

Inasmuch as the embodiment shown may be considerably modified without departing from these principles the invention should be understood to encompass modifications encompassed by the principles and be limited only by the spirit and scope of the following claims.

We claim:

1. A valve assembly comprising an integral valve housing having a passage extending therethrough, the ends of said passage defining an inlet and an outlet, a lateral opening communicating with said passage intermediate the ends thereof, an annular member mounted within said passage adjacent said inlet for limited axial movement, annular resilient sealing means between said annular member and said valve housing providing a fluidtight seal between said annular member and said passage and a valve key received in said housing through said lateral opening, said valve key including a central ball portion and opposed trunnion portions extending from said ball portion, said ball portion including means defining a passage extending laterally therethrough;

- the lower of the opposed trunnions being received in means defining a sleeve in said housing laterally opposite said lateral opening;
- the sleeve being defined by a cylindrical side wall having a cylindrical inner peripheral surface; said lower trunnion having means defining an annular groove therein; an annular sealing ring received in said groove for sealing said lower trunnion with respect to said sleeve inner peripheral surface;
- the valve housing being characterized by the absence of upstanding wall means surrounding the communication of said lateral opening with the exterior of the valve housing and by the presence of means defining an outwardly facing annular flat surface surrounding the communication of said lateral opening with the exterior of the valve housing;
- a spacer of L-shaped cross-sectional shape, having a depending portion and a radially extending annular portion, the depending portion seating against the valve key central ball portion;
- a washerlike annular resilient gasket interposed between said flat surface and the radially extending annular portion of said spacer;
- a plurality of angularly spaced screws received through said radially extending annular portion of said spacer and into said housing for securing the spacer to the housing; the heads of at least two of said screws separated angularly of the spacer by at least one intervening screw, protruding above the radially extending annular portion of the spacer;
- a key cap mounted on the upper trunnion of the valve key adjacent the exterior of the radially extending annular portion of the spacer;
- a lock wing mounted on the key cap and extending laterally therefrom at a level which intercepts the said two screws and which misses the at least one intervening screw, this interception limiting rotation of the valve key between a fully open and a fully closed position.